United States Patent [19]

Ladd

[11] Patent Number: 5,671,491

[45] Date of Patent: Sep. 30, 1997

[54] FUNCTIONAL ADVERTISING BLANKET

[76] Inventor: Jeff Ladd, 62 Welles Dr. North, Newington, Conn. 06111

[21] Appl. No.: 751,991

[22] Filed: Nov. 19, 1996

[51] Int. Cl.[6] ............... A47G 9/06; G09F 21/04
[52] U.S. Cl. .................. 5/417; 5/420; 40/591; 40/593
[58] Field of Search ............ 40/591, 593; 160/370.21, 160/370.23; 5/417–420

[56] References Cited

U.S. PATENT DOCUMENTS

| Re. 35,080 | 11/1995 | Nenstiel | 160/370.21 |
|---|---|---|---|
| 2,690,928 | 10/1954 | Boynes | 160/370.21 |
| 3,226,737 | 1/1966 | Rote | 5/417 |
| 4,470,630 | 9/1984 | Shields | 5/419 |
| 4,654,906 | 4/1987 | Roberts | 5/417 |
| 5,018,229 | 5/1991 | Eberhart | 5/417 |
| 5,046,543 | 9/1991 | Levy | 160/370.23 |
| 5,123,468 | 6/1992 | Mater, Jr. | 160/370.21 |
| 5,165,748 | 11/1992 | O'Connor | 160/370.23 |
| 5,244,278 | 9/1993 | Robitaille | 5/417 |
| 5,267,599 | 12/1993 | Kim | 160/370.23 |
| 5,356,191 | 10/1994 | Sheehan | 160/370.21 |
| 5,454,125 | 10/1995 | Ratkowski | 5/417 |

*Primary Examiner*—Steven N. Meyers
*Assistant Examiner*—Tuyet-Phuong Pham

[57] ABSTRACT

A combined blanket, sun screen and weather shield is formed having a comfort material on one side and a waterproof material on an opposite side thereof. The printed indicia is arranged on both sides for displaying advertising logos and the like. The blanket finds application at the beach as well as a sun screen and weather shield on the windshields of automobiles, vans and trucks.

6 Claims, 4 Drawing Sheets

FUNCTIONAL ADVERTISING BLANKET

BACKGROUND OF THE INVENTION

Advertising blankets are now available for providing indicia for advertising purposes while allowing beach blanket facility. U.S. Pat. No. 4,654,906 entitled "Beach Blanket with Sand Pockets" describes one such blanket.

A blanket in the form era waterproof material is described within U.S. Pat. No. 5,427,834 entitled "Waterproof Textile".

A garment having a cloth material on one side on a waterproof material on an opposite side is described within U.S. Pat. No. 5,182,812 entitled "Layered Reducing Garment".

The aforementioned blankets and garments are usually application specific and find little use outside the intended field.

When the primary intent of such blankets and garments is to display indicia for advertisement purposes, it would be desirable to the advertiser to have as wide an access to the public as conveniently possible. This is especially true when the advertiser provides the blankets and garments at cost and realize little, if any profit outside the sales of the advertised products.

One purpose of the invention is to provide a material having at least one side waterproof for exposure to the ground and the elements and the opposite side printed with advertising indicia for display over a wide range of uses.

SUMMARY OF THE INVENTION

A combined blanket, sun screen and weather shield is formed having a comfort material on one side and a waterproof material on an opposite side thereof. The printed indicia is arranged on both sides for displaying advertising logos and the like. The blanket finds application as a beach blanket as well as a sun screen and weather shield for windshields of automobiles, vans and trucks.

DESCRIPTION OF THE PREFERRED EMBODIMENT

Figure 1:
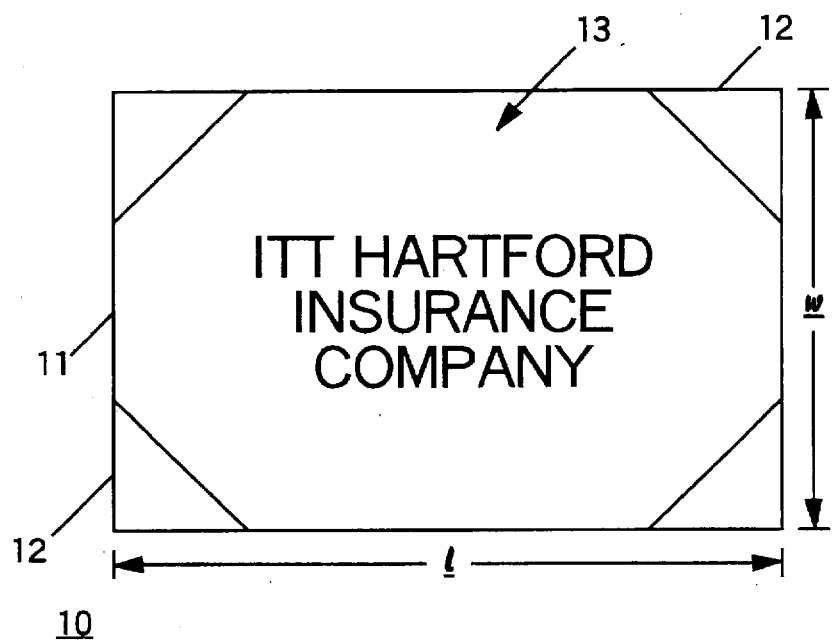
FIG. 1 is a top planar view of the combined textile element of the invention used as a beach blanket.

The advertising blanket 10 of the invention is shown in FIG. 1 to consist of a textile fabric 11 having a major dimension 1 of approximately six feet and a minor dimension w of approximately four feet. Pockets 12 are arranged on the corners for securing the fabric to the various substrates upon which the fabric is employed. For example, sand is inserted within the pockets to secure the textile when used as beach blanket. Advertising indicia 13 is applied to the surface reading in the long dimension 1 to display the indicia when used at the beach.

Figure 2:
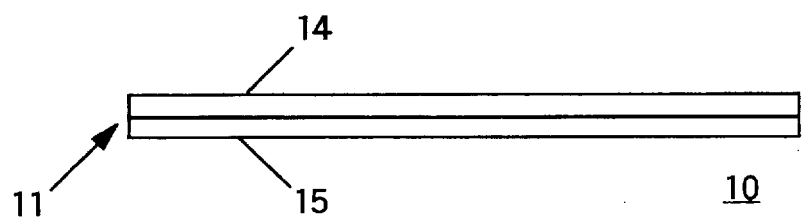
FIG. 2 is an end view of the element of FIG. 1.

The blanket 10 is shown in FIG. 2 to depict the fabric 11 as a layer of terry cloth 14 with a layer of clear vinyl 15 on the opposite side.

Figure 3:
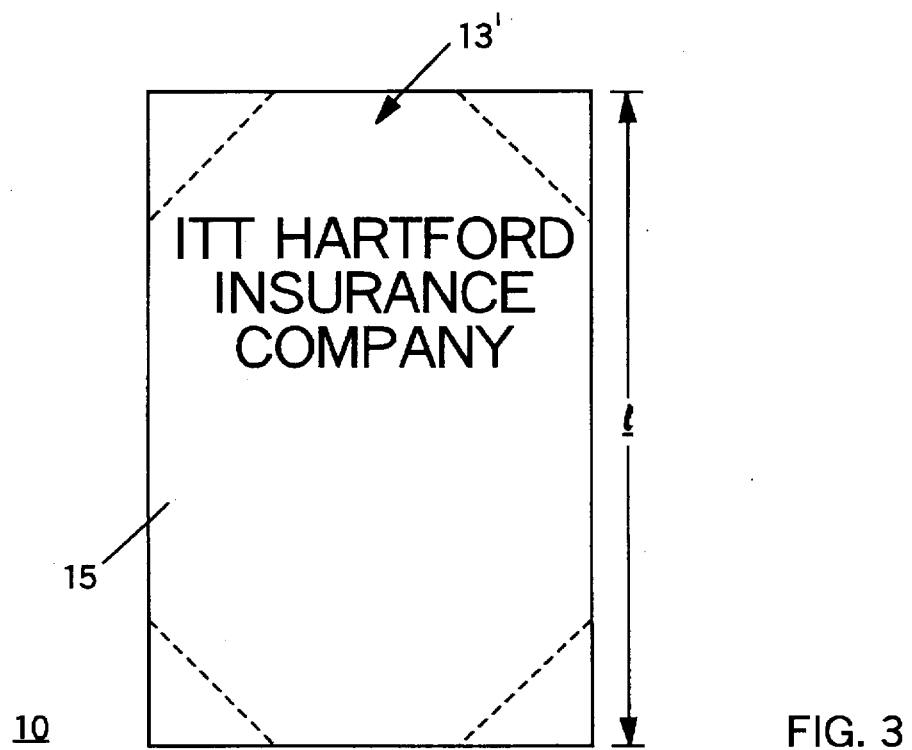
FIG. 3 is a top plan view of the opposite side of the textile element of FIG. 1.

The blanket 10 shown in FIG. 3 displays the vinyl side 15 containing indicia 13', applied to the surface reading in the short dimension w to allow the use of the blanket for displaying the advertising indicia 13'on both sides thereof.

Figure 4:
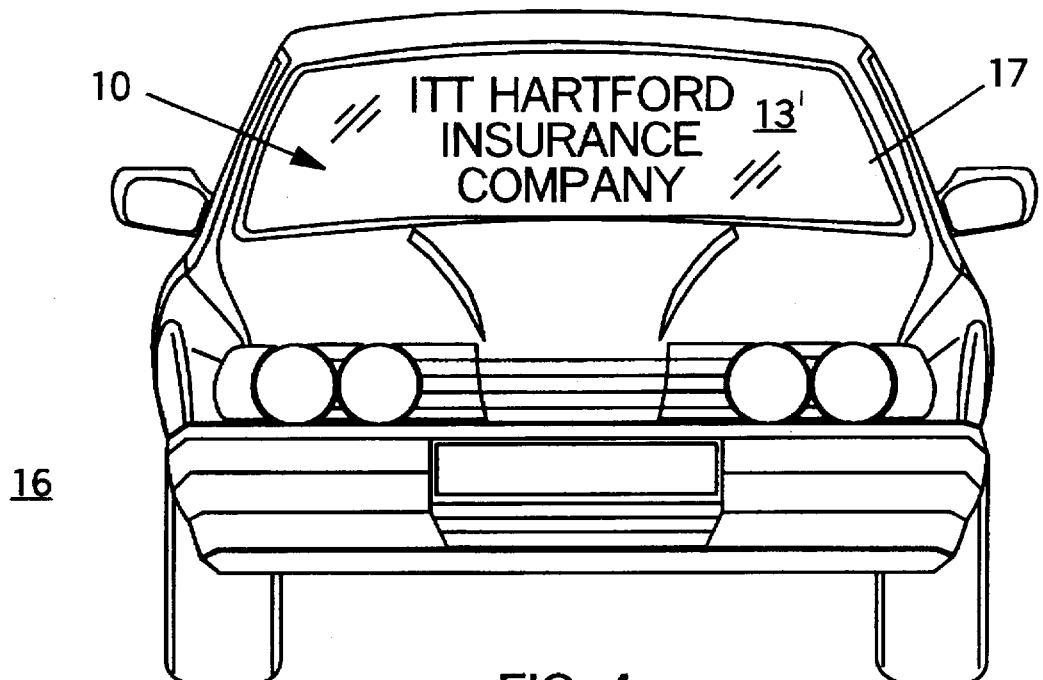
FIG. 4 is front view of an automobile using the opposite side of the textile element of FIG. 1 as a sun screen.

One further application of the blanket 10 is depicted in FIG. 4 attached to the interior of the windshield 17 on the auto 16. The blanket serves as a sun screen to protect the interior of the auto from the sun in temperate climates.

Figure 5:
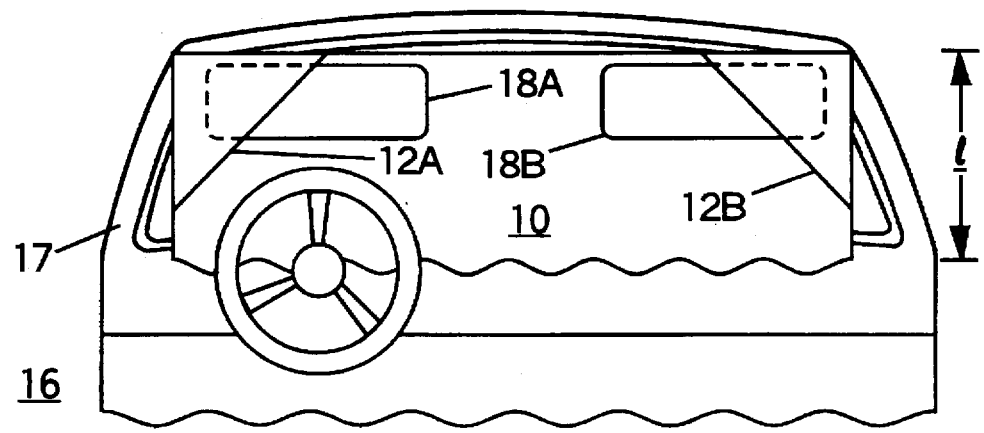
FIG. 5 is a front view of the interior of the automobile of FIG. 4.

The method of attachment of the blanket 10 to the windshield 17 is best seen by referring to the auto 16 as depicted in FIG. 5. The opposing corners 12A, 12B at one end of the blanket are arranged over corresponding visors 18A, 18B arranged on the driver and passenger sides of the auto. The blanket 10 is arranged to extend the long dimension 1 in the vertical plane as indicated.

Figure 6:
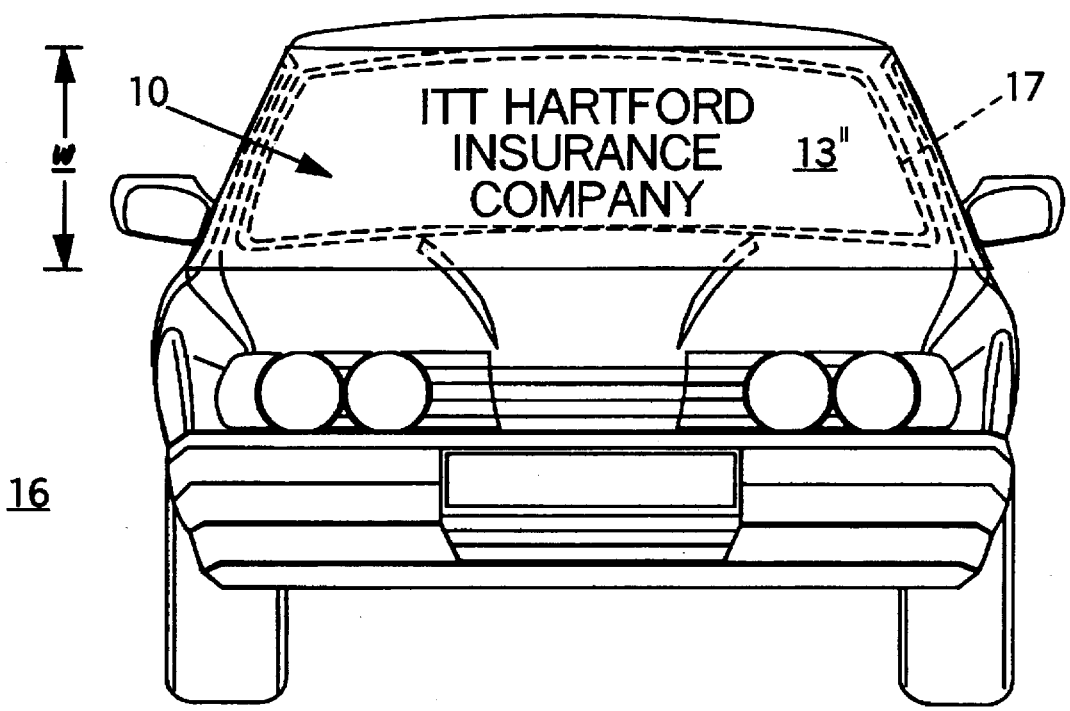
FIG. 6 is a front view of the automobile of FIG. 4 with the textile element used as a weather shield.

The arrangement of the blanket 10 as a weather shield on the exterior of the auto 16 is seen by now referring to FIG. 6. In this arrangement, the short dimension w is arranged in the vertical plane such that the indicia 13" is visible from the outside surface of the windshield 17 and the blanket 10 protects the windshield from sleet and snow formation.

Figure 7:
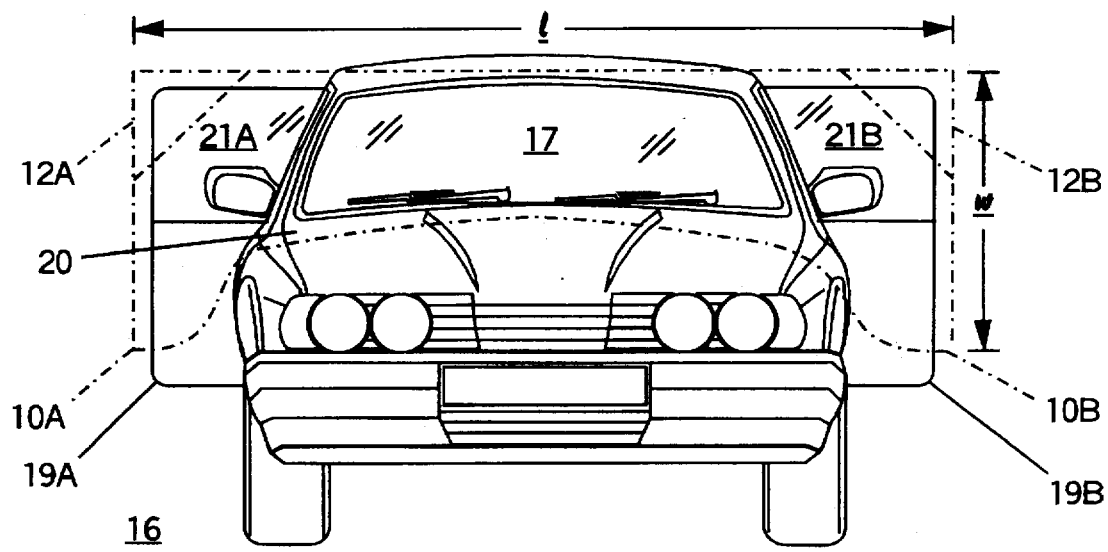
FIG. 7 is a front plan view of the automobile of FIG. 4 detailing the arrangement of the textile on the car doors.

The attachment of the blanket 10, shown in phantom, to the auto 16 is best seen by referring to FIG. 7 wherein the blanket is arranged with the short dimension w in the vertical plane and the long dimension 1 positioned over the windshield 17 and about the front doors 19A, 19B such that the opposing corners 12A, 12B are positioned over the ends of the front windows 21A, 21B. The doors 19A, 19B are closed to trap the opposing edges 10A, 10B of the blanket 10 are captured and trapped behind the doors upon closing. This arrangement of the blanket as a weather shield protects the windshield 17 and windows 21A, 21B from the snow and sleet. On trucks and vans, it is easier to arrange one of the opposing corners 12A over one visor 18A, position the blanket 10 over the outside of the windshield 17 and arrange the other corner 12B over the visor 18B, as shown earlier in FIG. 5.

A muti-functional blanket having a cloth side for comfort and a waterproof side for weather resistance has herein been described. The blanket finds application as a beach blanket, auto sun screen and auto weather shield.

The invention claimed is:

1. A multi-purpose blanket in combination with an automobile comprising:

first and second opposing surfaces, said first surface consisting of a cloth material and said second surface consisting of a vinyl;

first and second sides defining a rectangle wherein said first side is shorter than said second side; first indicia on one of said first and second surfaces defining an advertising logo; and pockets formed on opposing corners of said first and second sides, said pockets providing means for securing said rectangle to a substrate, said blanket is adapted for arranging on an interior of an automobile for providing a sun screen to a windshield and a pair of said pockets are arranged over corresponding visors attached to said interior of said automobile.

2. The multi-purpose blanket of claim 1 wherein said first indicia is arranged on said first surface in the form of letters arranged in a plane parallel with said first surface.

3. The multi-purpose blanket of claim 2 including second indicia on said second surface in the form of letters arranged in a plane parallel with said second surface.

4. The multi-purpose blanket of claim 1 wherein said blanket is adapted for arranging on a beach with said first indicia facing in an upwards direction.

5. A multi-purpose blanket in combination with an automobile comprising:

first and second opposing surfaces, said first surface consisting of a cloth material and said second surface consisting of a vinyl;

first and second sides defining a rectangle wherein said first side is shorter than said second side; first indicia on one of said first and second surfaces defining an advertising logo; and pockets formed on opposing corners of said first and second sides, said rectangle is adapted for arranging on the exterior of an automobile for providing weather shield to a windshield, and a pair of said pockets are arranged over corresponding ends of door windows on said automobile.

6. The multi-purpose blanket of claim 5 wherein a pair of said pockets are arranged over corresponding visors attached to an interior of said automobile.

* * * * *